United States Patent [19]
Mennemeier et al.

[11] Patent Number: 5,984,515
[45] Date of Patent: Nov. 16, 1999

[54] COMPUTER IMPLEMENTED METHOD FOR PROVIDING A TWO DIMENSIONAL ROTATION OF PACKED DATA

[75] Inventors: Larry M. Mennemeier, Boulder Creek, Calif.; Alexander D. Peleg, Haifa, Israel; Carole Dulong, Saratoga, Calif.; Eiichi Kowashi, Ryugasaki, Japan; Millind Mittal, South San Francisco, Calif.; Benny Eitan, Haifa, Israel

[73] Assignee: Intel Corporation, Santa Clara, Calif.

[21] Appl. No.: 08/917,671

[22] Filed: Aug. 21, 1997

Related U.S. Application Data

[63] Continuation of application No. 08/573,531, Dec. 15, 1995, abandoned.

[51] Int. Cl.[6] .............................. G06F 17/14; G06F 9/302
[52] U.S. Cl. ...................................... 364/725.03; 395/562
[58] Field of Search ...................... 364/725.03, 736.03; 395/562, 563, 137; 382/250

[56] References Cited

U.S. PATENT DOCUMENTS

| | | | |
|---|---|---|---|
| 3,711,692 | 1/1973 | Batcher ...................................... | 235/175 |
| 3,723,715 | 3/1973 | Chen et al. .............................. | 235/175 |
| 3,959,582 | 5/1976 | Law et al. ................................. | 178/6.8 |
| 4,146,925 | 3/1979 | Green et al. ............................. | 364/521 |
| 4,161,784 | 7/1979 | Cushing et al. ......................... | 364/748 |
| 4,393,468 | 7/1983 | New ........................................ | 364/736 |
| 4,418,383 | 11/1983 | Doyle et al. ............................. | 364/200 |
| 4,498,177 | 2/1985 | Larson ..................................... | 371/52 |
| 4,707,800 | 11/1987 | Montrone et al. ....................... | 364/788 |
| 4,754,269 | 6/1988 | Kishi et al. .............................. | 340/729 |
| 4,771,379 | 9/1988 | Ando et al. .............................. | 364/200 |
| 4,989,168 | 1/1991 | Kuroda et al. ..................... | 364/715.09 |
| 5,095,457 | 3/1992 | Jeong ....................................... | 364/758 |
| 5,187,679 | 2/1993 | Vassiliadis ............................... | 364/786 |
| 5,473,557 | 12/1995 | Harrison et al. ................... | 364/736.03 |
| 5,493,521 | 2/1996 | Oota ................................... | 364/736.03 |
| 5,568,600 | 10/1996 | Kaba ........................................ | 395/137 |
| 5,594,679 | 1/1997 | Iwata ....................................... | 382/250 |

OTHER PUBLICATIONS

J. Shipnes, *Graphics Processing with the 88110 RISC Microprocessor*, IEEE (1992), pp. 169–174.

*MC88110 Second Generation RISC Microprocessor User's Manual*, Motorola Inc. (1991).

*Errata to MC88110 Second Generation RISC Microprocessor User's Manual*, Motorola Inc. (1992), pp. 1–11.

*MC88110 Programmer's Reference Guide*; Motorola Inc. (1992), pp. 1–4.

*860™ Microprocessor Family Programmer's Reference Manual*; Intel Corporation (1992), Ch. 1,3,8,12.

R. B. Lee, *Accelerating Multimedia With Enhanced Microprocessors*, IEEE Micro (Apr. 1995), pp. 22–32.

(List continued on next page.)

*Primary Examiner*—David H. Malzahn
*Attorney, Agent, or Firm*—Blakely, Sokoloff, Taylor & Zafman LLP

[57] ABSTRACT

In a computer system having stored therein a first and a second packed data having corresponding data elements, a method for generating a two dimensional rotation of said packed data. The method includes the steps of generating a first set of intermediate results in response to a first instruction by multiplying the data elements of the first packed data with corresponding elements of a third packed data. The elements of said third packed data represent either a sine or cosine function. A second step of generating a second set of intermediate results in response to a second instruction by multiplying the data elements of the second packed data with corresponding elements of a fourth packed data. The elements of the fourth packed data represent either a sine or cosine function. A third and final step of generating a set of final results in response to a third instruction by performing an arithmetic operation between corresponding elements of the first and second sets of intermediate results. The final results represent a two dimensional rotation of the elements of the first set of packed data.

29 Claims, 7 Drawing Sheets

OTHER PUBLICATIONS

*TMS320C2x User's Guide,* Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video,* Microprocessor Report (Jan. 1994), pp. 16,17.

SPARC Technology Business, *UltraSPARC Multimedia Capabilities On–Chip Support for Real–Time Video and Advanced Graphics,* Sun Microsystems (Sep. 1994).

Y. Kawakami et al., *LSI Applications: A Single–Chip Digital Signal Processor for Voiceband Applications,* Solid State Circuits Conference, DIgest of Technical Papers; IEEE International (1980).

B. Case, *Philips Hopes to Displace DSPs with VLIW,* Microprocessor Report (Dec. 94), pp. 12–18.

N. Margulis,*i860 Microprocessor Architecture,* McGraw Hill, Inc. (1990) Ch. 6,7,8,10,11.

*Pentium Processor User's Manual, vol. 3: Architecture and Programming Manual,* Intel Corporation (1993), Ch. 1,3,4, 6,8, and 18.

FIG. 7

| $X_1$ | $X_2$ | $X_3$ | $X_4$ | 702 |
|---|---|---|---|---|
| 702a | 702b | 702c | 702d | |

| $Cos\theta \cdot C$ | $Cos\theta \cdot C$ | $Cos\theta \cdot C$ | $Cos\theta \cdot C$ | 704 |
|---|---|---|---|---|
| 704a | 704b | 704c | 704d | |

| $X_1 \cdot (Cos\theta \cdot C)$ | $X_2 \cdot (Cos\theta \cdot C)$ | $X_3 \cdot (Cos\theta \cdot C)$ | $X_4 \cdot (Cos\theta \cdot C)$ | 706 |
|---|---|---|---|---|
| 706a | 706b | 706c | 706d | |

| $Y_1$ | $Y_2$ | $Y_3$ | $Y_4$ | 708 |
|---|---|---|---|---|
| 708a | 708b | 708c | 708d | |

| $Sin\theta \cdot C$ | $Sin\theta \cdot C$ | $Sin\theta \cdot C$ | $Sin\theta \cdot C$ | 710 |
|---|---|---|---|---|
| 710a | 710b | 710c | 710d | |

| $Y_1 \cdot (Sin\theta \cdot C)$ | $Y_2 \cdot (Sin\theta \cdot C)$ | $Y_3 \cdot (Sin\theta \cdot C)$ | $Y_4 \cdot (Sin\theta \cdot C)$ | 712 |
|---|---|---|---|---|
| 712a | 712b | 712c | 712d | |

| $(X_1 \cdot (Cos\theta \cdot C)) - (Y_1 \cdot (Sin\theta \cdot C))$ | $(X_1 \cdot (Cos\theta \cdot C)) - (Y_1 \cdot (Sin\theta \cdot C))$ | $(X_1 \cdot (Cos\theta \cdot C)) - (Y_1 \cdot (Sin\theta \cdot C))$ | $(X_1 \cdot (Cos\theta \cdot C)) - (Y_1 \cdot (Sin\theta \cdot C))$ | 714 |
|---|---|---|---|---|
| 714a | 714b | 714c | 714d | |

| $X'_1$ | $X'_2$ | $X'_3$ | $X'_4$ | 716 |
|---|---|---|---|---|
| 716a | 716b | 716c | 716d | |

COMPUTER IMPLEMENTED METHOD FOR PROVIDING A TWO DIMENSIONAL ROTATION OF PACKED DATA

This is a continuation of application Ser. No. 08/573,531, filed Dec. 15, 1995, now abandoned.

BACKGROUND OF THE INVENTION

1. Field of the Invention

The invention relates to computers and more specifically to the processing of multimedia data parameters.

2. Description of Related Art

Computer multimedia applications typically involve the processing of high volumes of small data values representing audio signals and video images. Many times processing the data includes performing transform coding which is a method of converting the data values into a series of transform coefficients for more efficient transmission, computation, encoding, compression, or other processing algorithms.

More specifically, the data values often represent a signal as a function, for example, of time. The transform coefficients represent the same signal as a function, for example, of frequency. There are numerous transform algorithms, including, for example, the fast fourier transform (FFT), the discrete cosine transform (DCT), and the Z transform. Corresponding inverse transform algorithms, such as an inverse DCT, convert transform coefficients to sample data values. Many of these algorithms include multiple mathematical steps. A DCT, for example, includes a step identical to a two dimensional rotation of the data values.

The steps of the rotation involve assuming two separate data values represent X and Y positions, respectively, on a two-dimensional graph. The two dimensional rotation is performed by modifying the values to represent new positions on the X and Y axis.

The equations typically used by the DCT to rotate the positions are illustrated in table one below. In the equations, the coefficient C represents a scaling factor to determine a distance of the movement.

TABLE 1

$$X' = C \cdot ((Cos\theta \cdot X) -/+ (Sin\theta \cdot Y))$$
$$Y' = C \cdot ((Sin\theta \cdot X) -/+ (Cos\theta \cdot Y))$$

A prior method implementing the above equations by computing the two dimensional rotation of the data values on conventional computers, involves the slow and inefficient method of using at least three instructions to generate one resulting value representing a modified X or Y component. For example, one or more instructions are used to generate the product of a first data value and a cosine or sine function, the same for a second product, and a third instruction to generate the sum or difference of the first and second product.

However, recent advancements in more modern computers provide a system that is able to process the small data values more efficiently. More specifically, multiple data elements are joined together as packed data sequences. The packed data sequences enable the transfer of up to sixty-four bits of integer data. As a result, in addition to the conventional thirty-two bit integer register file, a multimedia (MM) register file is provided to take advantage of the packed data sequences. The MM register file typically has extended registers providing storage for sixty-four data bits.

With the availability of the packed data and the MM registers, a second method is available to generate the two dimensional rotation of the data values. The second method, however, uses additional instruction per final result to generating a more accurate result. For example, as previously stated, the DCT is typically used to encode the data values possibly representing pixels of a video image. Thereafter, the encoded data is processed to regenerate the original image. However, when regenerating an image that is not frequently refreshed (i.e., stationary images), there is a higher demand placed on the accuracy of regenerating the image. In such cases, cumulative errors are very noticeable. On the other hand, when regenerating an image for motion video, such as MPEG, the referenced image is typically refreshed more frequently. Therefore, the accumulated errors in the encoded pixel data are not as noticeable, and as a result, there is not as great of a need for accuracy, thereby allowing more effort to be place on increasing the speed of processing the data.

Even though the second method was developed to provide greater accuracy, it is nevertheless discussed below to provide a background for further illustrating the need for a faster method of generating the two dimensional rotation of packed data, and therefore the advantages and novelty of the method of the present invention.

As illustrated in Table 2 below, the second method, using packed data, typically involves using at least four to five instructions to generate two resulting values. More specifically, a first instruction assumes two adjacent data values in memory represent X and Y components, respectively. The two data values are loaded into a first register in the non-planar format as packed words, each filling a sixteen bit element of the four sixteen bit elements available in the MM register. (Table 2a). A second instruction copies the data to take advantage of the unused data space in the register. (Table 2b). A third instruction performs two micro-operations. In the third instruction, a second packed data is provided as a memory operand containing either sine or cosine functions (Table 2c). The elements of the first packed data are multiplied with the corresponding elements of the packed data memory operand, thereby providing a set of intermediate results in packed data (Table 2d). Next, in the set of intermediate results packed data, adjacent elements are added. (Table 2e). As a result, two resultant values are provided in thirty-two bit formats, which is a larger format than desired for subsequent processing steps in typical transform algorithms. Thus, a fourth instruction is used to perform a right addition shift to truncate the resulting values to sixteen bit values. (Table 2e). Next, a fifth instruction can be used to copy the data values into the adjacent positions so as to be re-stored in memory as the modified X and Y components representing the two-dimensional rotation. (Table 2f).

TABLE 2

| | | X | Y | a |
|---|---|---|---|---|
| X | Y | X | Y | b |
| C · Cos | C · Sin | C · Cos | C · Sin | c |
| X · C · Cos | Y · C · Sin | X · C · Cos | Y · C · Sin | d |
| (X · (C · Cos)) + (Y · (C · Sin)) | | (X · (C · Cos)) + (Y · (C · Sin)) | | e |
| >>16 | X' | >>16 | Y' | f |
| | | X' | Y' | g |

The second method, however, inefficiently includes instructions that duplicate the data, truncate and normalize the resultant data into the desired lengths, and furthermore, copy the data values back into the original adjacent positions. These extra instructions are costly time consuming instructions that impede the optimum processing speed of generating the two dimensional rotation of the data by using four to five instructions to generate only two results.

In the cases where accuracy is not a highest concern, what is needed is a faster and more efficient method that is able to generate a greater number of resulting values representing the two dimensional rotation of the data values through the use of fewer instructions.

SUMMARY OF THE INVENTION

In a computer system having stored therein a first and a second packed data having corresponding data elements, a method for generating a two dimensional rotation of said packed data. In one embodiment, the method includes the steps of generating a first set of intermediate results in response to a first instruction by multiplying the data elements of the first packed data with corresponding elements of a third packed data. The elements of said third packed data represent either a sine or cosine function. A second step of generating a second set of intermediate results in response to a second instruction by multiplying the data elements of the second packed data with corresponding elements of a fourth packed data. The elements of the fourth packed data represent either a sine or cosine function. A third and final step of generating a set of final results in response to a third instruction by performing an arithmetic operation between corresponding elements of the first and second sets of intermediate results. The final results represent a two dimensional rotation of the elements of the first set of packed data.

PIG. 5 illustrates the MOVQ operation used in one embodiment in the method of the present invention.

Figure 6:
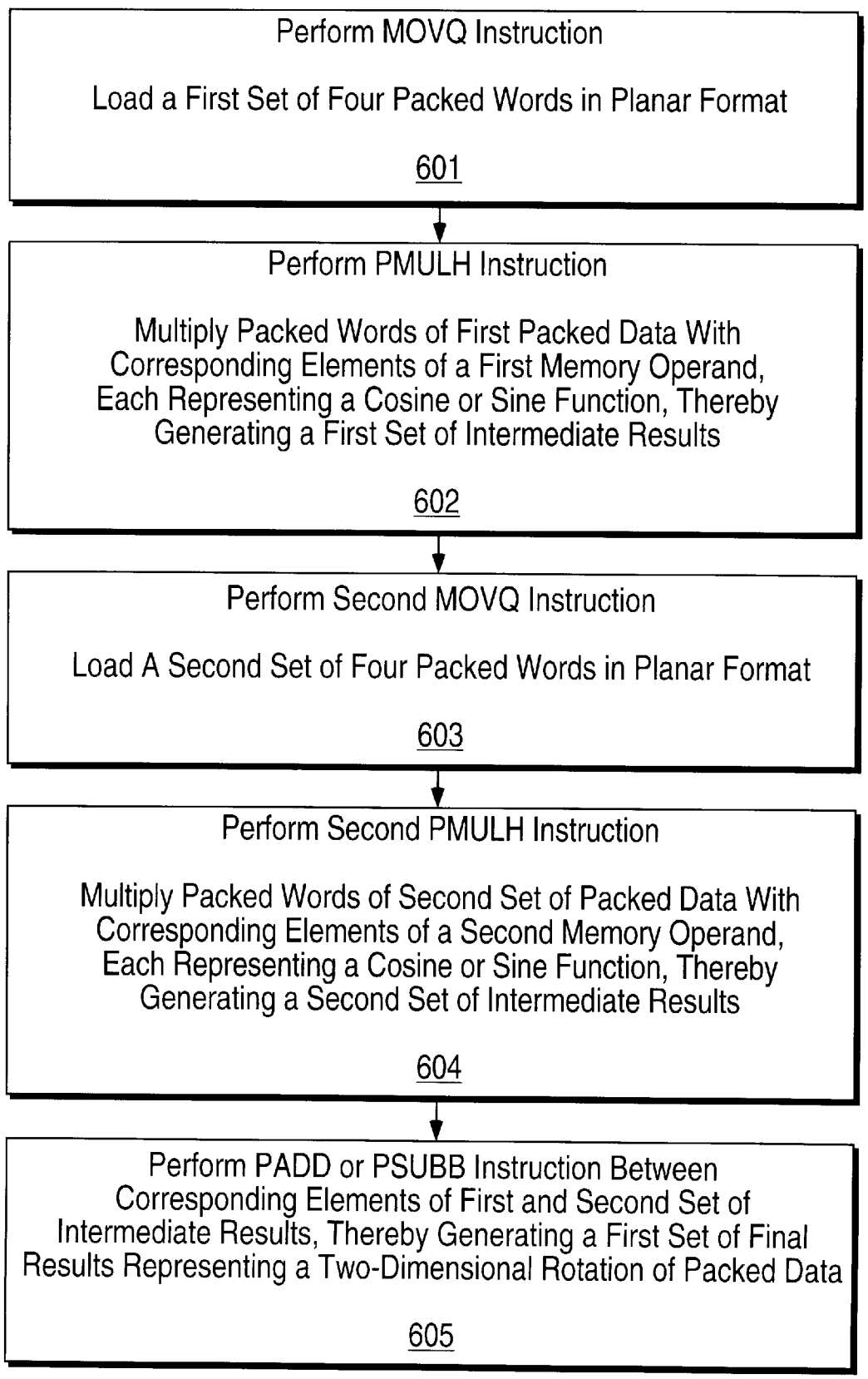

FIG. 6 illustrates a block diagram of the steps used in the method of the present invention.

FIG. 7 illustrates the packed data operations used in the method of the present invention.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. En other instances, well known features are omitted or simplified in order not to obscure the present invention.

Computer System of the Invention

Figure 1:
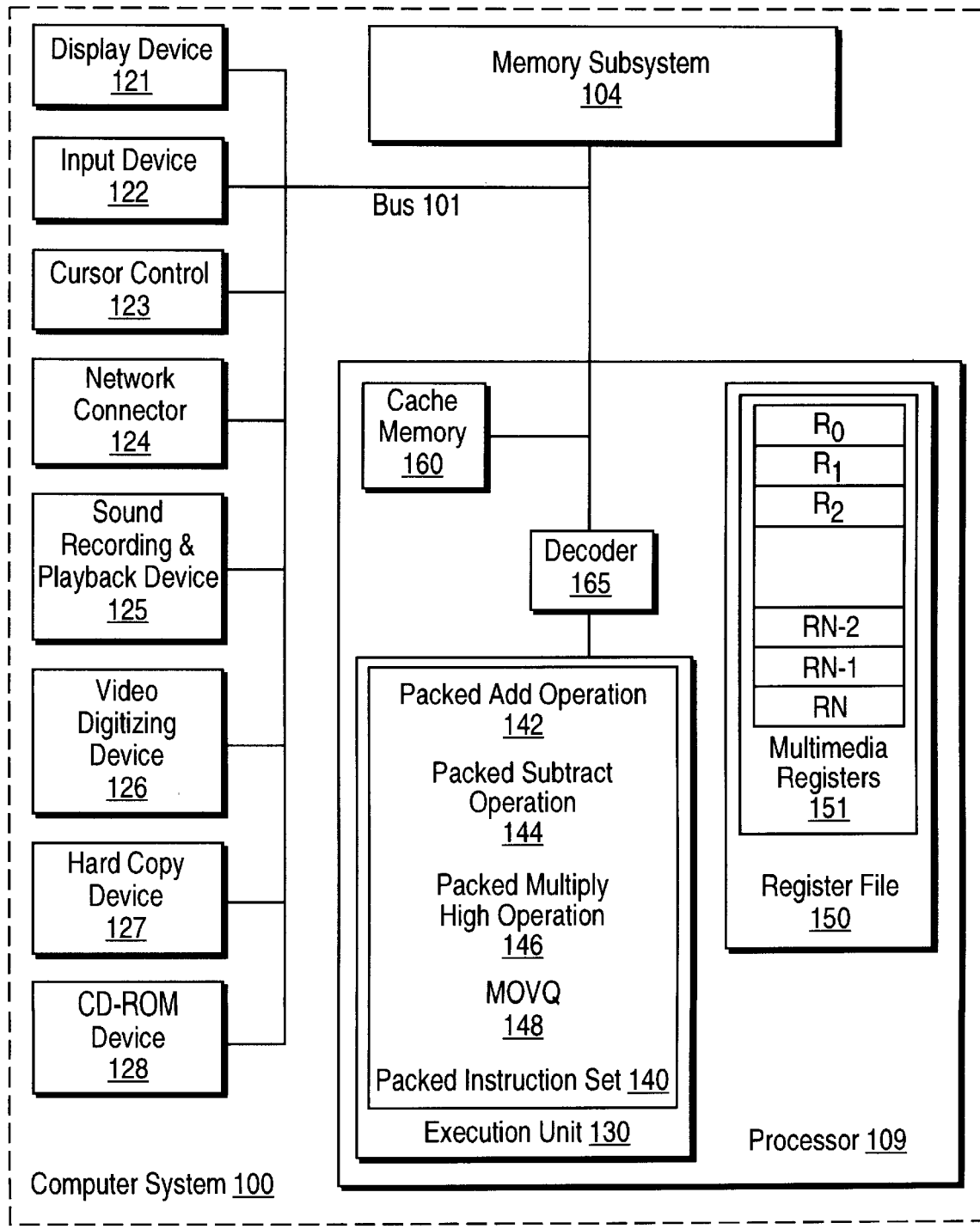
FIG. 1 illustrates a computer system in accordance with one embodiment of the invention.

FIG. 1 shows a computer system 100 in accordance with one embodiment of the invention. Computer system 100 comprises a bus 101 for communicating information, processor 109 coupled to bus 101 for processing information, and memory subsystem 104 coupled to bus 101 for storing information and instructions for processor 109.

In one embodiment, processor 109 includes an execution unit 130, a register file 150, a cache memory 160, a decoder 165, and an internal bus 170. Cache memory 160, storing frequently and/or recently used information for processor 109, is coupled to execution unit 130. Register file 150 stores information in processor 109 and is coupled to execution unit 130 via internal bus 170. In one embodiment of the invention, register file 150 includes multimedia registers 151 for storing multimedia information. In one embodiment, multimedia registers 151 each store up to sixty-four bits of packed data. Multimedia registers 151 may be dedicated multimedia registers or registers which are used for storing multimedia information and other information. In one embodiment, multimedia registers 151 store multimedia data when performing multimedia operations and store floating point data when performing floating point operations.

Execution unit 130 operates on packed data according to the instructions received by processor 109 that are included in packed instruction set 140. Execution unit 130 also operates on scalar data according to instructions implemented in general-purpose processors. In one embodiment of the invention, processor 109 supports the Pentium® microprocessor instruction set and the packed instruction set 140. By including packed instruction set 140 into a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER, and MOTOROLA. Alpha™ is a trademark of Digital Equipment Corporation.)

In one embodiment of the invention, packed instruction set 140 includes instructions for executing a Packed Multiply light 146, a Packed Addition 142, a Packed Subtraction operation 144, and a MOVQ operation 148.

By including packed instruction set 140 in the instruction set of general-purpose processor 109 along with associated circuitry to execute the instructions, the operations used by many existing multimedia applications may be performed using packed data in a general-purpose processor. Thus, many multimedia applications may be executed more efficiently by using the full width of a processor's data bus for performing operations on packed data. This eliminates the need to transfer smaller units of data across the processor's data bus to perform one or more operations one data element at a time.

Still referring to FIG. 1, the computer system 100 of the invention includes a display device 121 such as a monitor. The display device 121 may include an intermediate device such as a frame buffer. The computer system 100 includes an input device 122 such as a keyboard, and a cursor control 123 such as a mouse, or trackball, or trackpad. The display device 121, the input device 122, and the cursor control 123 are coupled to bus 101. Computer system 100 may also include a network connector 124 such that computer system 100 is part of a local area network (LAN) or a wide area network (WAN). Additionally, computer system 100 can be coupled to a device for sound recording, and/or playback 125, such as an audio digitizer coupled to a microphone for recording voice input for speech recognition. Computer system 100 may also include a video digitizing device 126 that can be used to capture video images, a hard copy device 127 such as a printer, and a CD-ROM device 128. The devices 124–128 are also coupled to bus 101.

Packed Data Formats of the Invention

In one embodiment of the invention, the execution unit 130 operates on data in several different packed data formats. For example, in one embodiment, the computer system 100 manipulates sixty-four-bit data groups. In this embodiment, packed data can be in one of three formats: a packed byte format, a packed word format, or a packed double-word (dword) format. Packed data in a packed byte format includes eight separate 8-bit data elements. Packed data in a packed word format includes four separate 16-bit data elements and packed data in a packed dword format includes two separate 32-bit data elements. Examples of particular operations are discussed below with reference to packed word format. However, the operations apply similarly to any of the packed data formats of the invention.

Additionally, many of the instructions of packed instruction set 140 can operate on signed or unsigned data and can be performed with or without "saturation". If an operation is performed using saturation, the value of the data element is clamped to a predetermined maximum or minimum value when the result of the operation exceeds the range of the data element. Exceeding the range of the data element is also referred to as data overflow or underflow. The use of saturation avoids the effects of data overflow or underflow.

Packed Data Instructions of the Invention

Figure 2:
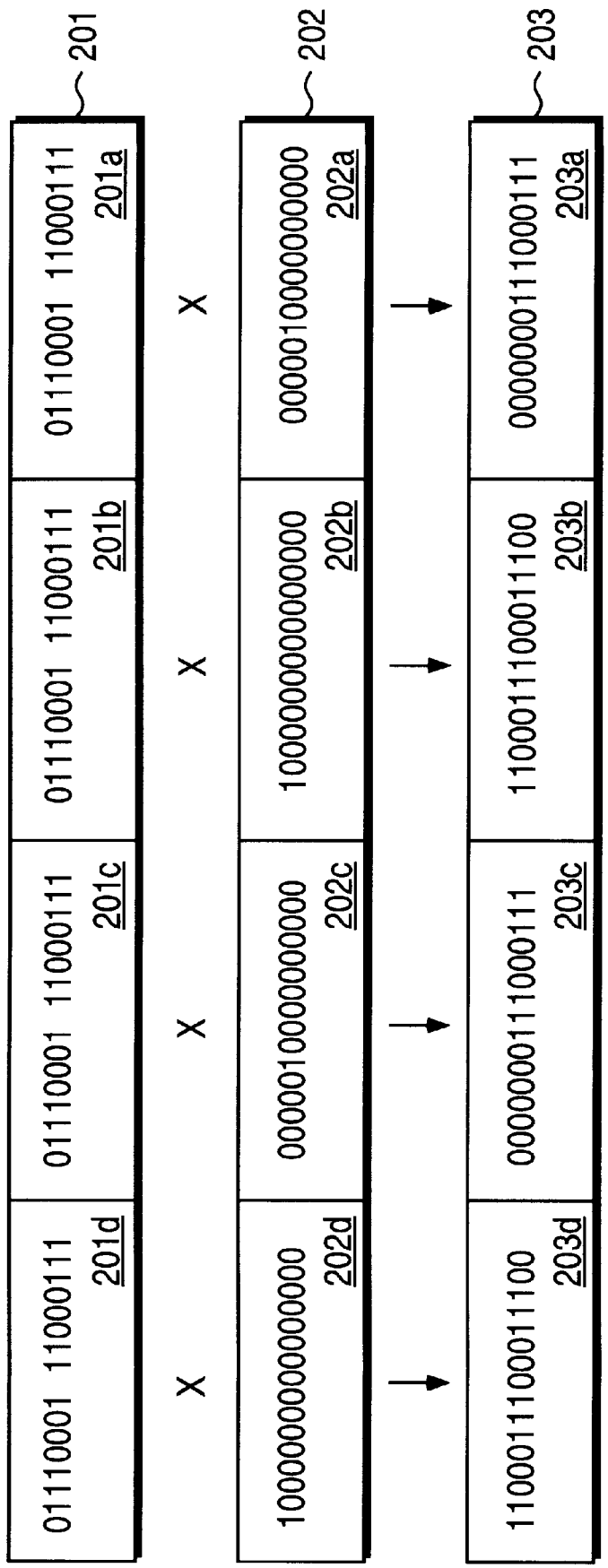
FIG. 2 illustrates the Packed Multiply High operation used in one embodiment in the method of the present invention.
Figure 3:
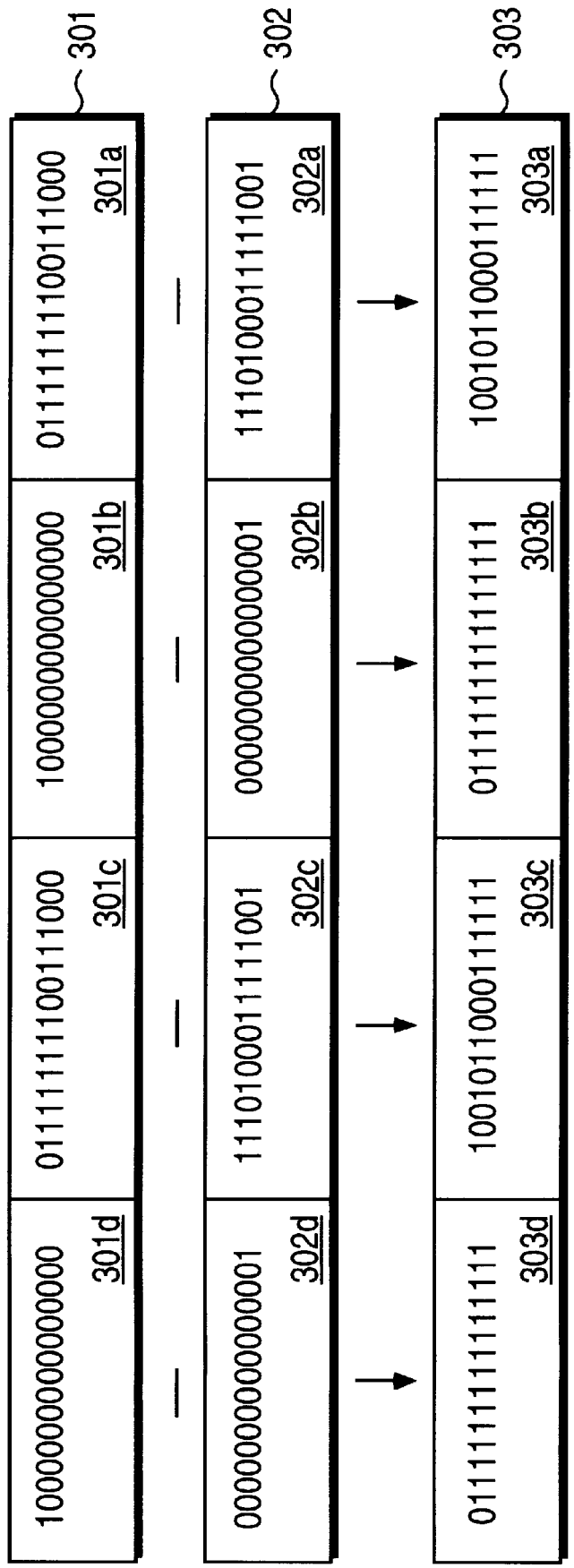
FIG. 3 illustrates the Packed Subtraction operation used in one embodiment in the method of the present invention.
Figure 4:
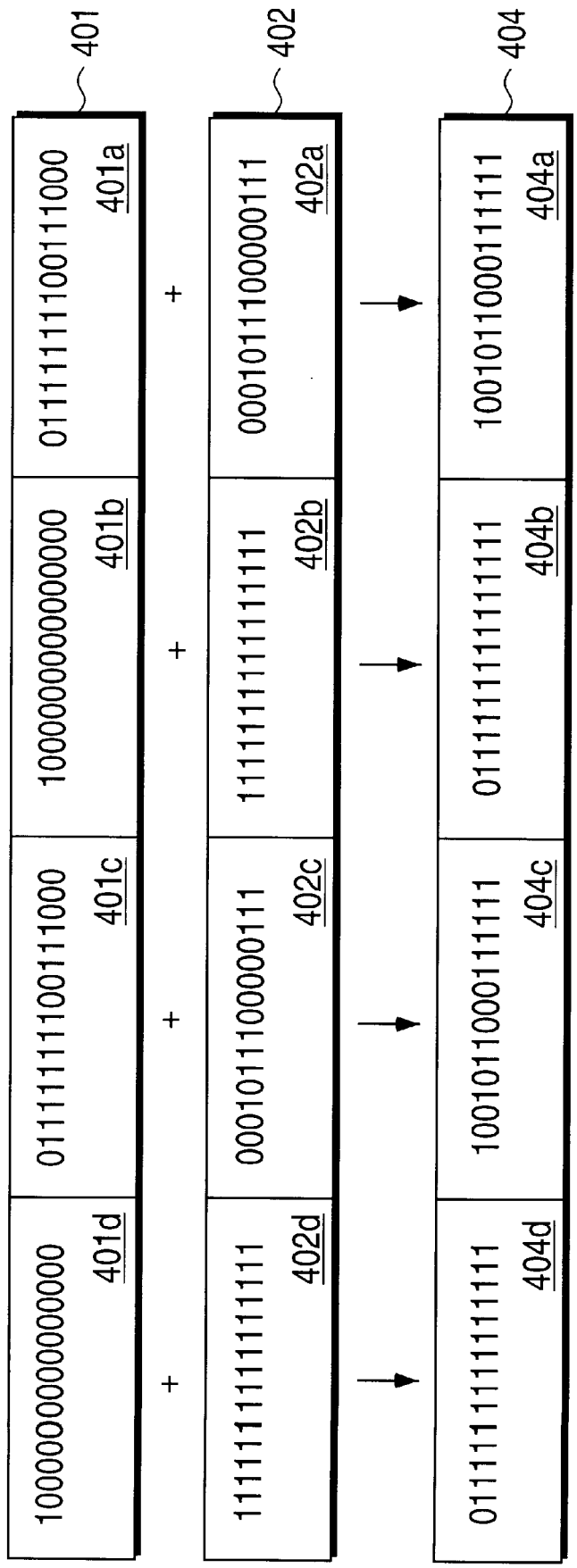
FIG. 4 illustrates the Packed Addition operation used in one embodiment in the method of the present invention.

Referring now to FIGS. 2–4, one embodiment of the instructions of packed instruction set 140 is described in more detail. In each example described below, the Source 1, Source 2, and Results are packed data located in multimedia registers 151. Alternate embodiments may access Source 1, Source 2, and/or Result directly from memory 104. In other embodiments, these registers can be stored in a general purpose register file.

FIG. 2 illustrates an example of the Packed Multiply High (PMULH) operation 146. Data element 203a of Result 203 includes the high order sixteen bits of the product of data element 201a of Source 201 and data element 202a of Source 202. Data element 203b of Result 203 includes the high order sixteen bits of the product of data element 201b of Source 201 and data element 202b of Source 202. Other data elements of Result 203 are computed in a similar manner. The low-order bits of the result are ignored. In alternative embodiments, a packed data memory operand may be used as Source 2 to generate Result 203.

FIG. 3 illustrates an example of the Packed subtraction operation 144. Data element 303a of Result 303 is the difference data element 301a of Source 301 and data element 302a of Source 302. Data element 303b of Result 303 is the difference of data element 301b of Source 301 and data element 302b of Source 302.

FIG. 4 illustrates an example of the Packed addition operation 142. Data element 403a of Result 403 is the sum of data element 401a of Source 401 and data element 402a of Source 402. Data element 403b of Result 403 is the sum of data element 401b of Source 401 and data element 402b of Source 402.

Figure 5:
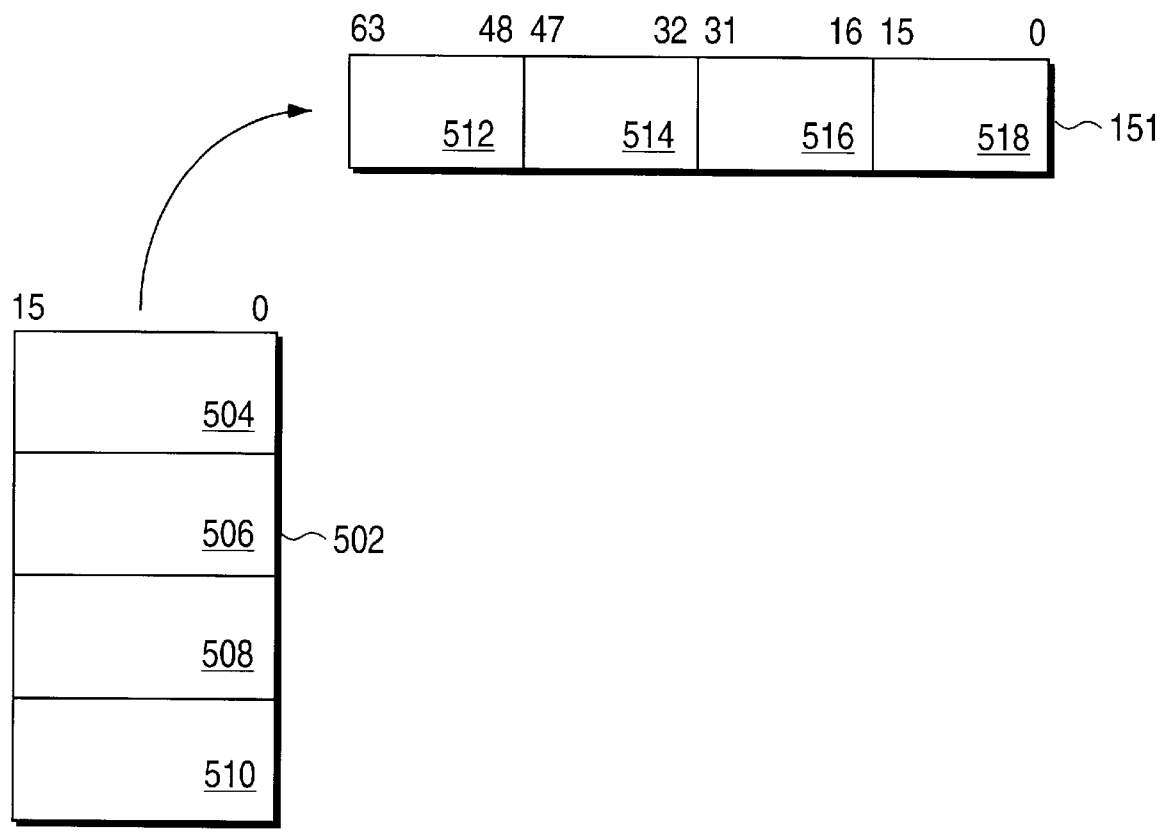

One embodiment of the invention includes a move operation referred to as MOVQ 148, which is used to transfer sixty-four data bits, four packed words, to and from the multimedia registers 151. FIG. 5 illustrates an example of the MOVQ operation. Packed data 502, having packed words 504, 506, 508 and 510 located in memory are transferred to a register of multimedia registers 151, and stored as data elements 512, 514, 516 and 518, respectively.

METHOD OF GENERATING TWO DIMENSIONAL ROTATION

As previously mentioned, the invention relates to a novel and accelerated method of generating a two dimensional rotation of data values typically used in multimedia algorithms to process data values. In particular, the invention involves a unique method of using data values in packed data format, and unique packed data instructions to provide a faster and more efficient method of generating the two dimensional rotation of the data values through the use of fewer instructions compared to alternative methods.

The specific steps included in the method of the invention are illustrated in FIG. 7 and the block diagram of FIG. 6. In step 601, the MOVQ 148 instruction is used to transfer four data values representing an audio signal or a video image from a storage such as memory 104 as a first packed data 702 having four packed words 702a–702d. The packed words are loaded into a first register of the multimedia registers 151. The packed words are loaded in a planar format, wherein each packed word is assumed to represent a separate position on one axis of a two-dimensional graph, such as the X-axis. The use of the MOVQ 148 instruction provides the advantage of loading four packed words with one instruction, thereby eliminating a need to duplicate the loaded data values or perform additional load operations.

In step 602, a PMULH 146 instruction is issued multiplying the packed words 702a–702d of the first packed data with the corresponding elements 704a–704d of a memory operand stored as a packed data. The elements of the memory operand 704a–704d each represent a cosine or sine function, depending upon the desired final result, in accordance with the equations set forth in table 1. For example, if the method is being implemented to generate a modified X component and the first packed words 702a–702d in the first register are assumed to represent positions along the X axis, then the first memory operand 704 includes elements representing cosine functions.

The PMULH 146 takes advantage of the inherent sixteen-bit fractional data generated by the multiplication with the cosine or sine function. As previously explained, the PMULH 146 only retains the high order sixteen bits of the resultant product, and disregards the lower order bits, which are not critical in the present invention which sacrifices accuracy to obtain a greater processing speed. As such, the single instruction, PMULH 146 provides a first set of four intermediate results 706a–706d as packed words, thereby eliminating the need for additional instructions to shift or truncate the intermediate results to provide the intermediate results in sixteen bit formats. The results are stored in a register of the multimedia registers of 151, as a packed data sequence.

In step 603, step 601 is repeated wherein a second MOVQ instruction is issued to transfer a second packed data sequence 708. The second packed data sequence also includes four packed words 708a–708d that are again loaded in a planar format, wherein each packed word is assumed to represent a separate position on a second axis, such as the Y-axis.

In step 604, step 602 is repeated wherein a second PMULH 146 instruction is issued multiplying packed words 708a–708d of the second packed data sequence 708 with the corresponding elements of a memory operand stored as a packed data sequence. Once again, the elements 710a–710d of the memory operand each represent a cosine or sine function depending upon the desired final result, in accordance with the equations set forth in table 1. The results are stored as a packed data sequence 712 in one of the multimedia registers 151, thereby representing a second set of intermediate results.

In step 605, a fifth instruction providing the final operation for the equations set forth in Table 1, either a PSUB 144 or a PADD 142, is issued to perform an arithmetic operation between the corresponding elements of the first and second set of intermediate results 714a–714d. As a result, in one embodiment, a first set of four final results presented as packed words 716a–716d, each representing a two dimensional rotation of the first packed data 702, are generated through the use of only five instructions.

In the same embodiment, to provide the modified position and values of the second packed data 708, similar steps would be implemented. Specifically, the original values of the first and second packed data 702 & 708 would be retained. A third PMULH 146 instruction would be issued to multiply elements of the first packed data 702 and corresponding elements of the second memory operand 710, thereby generating a third set of intermediate results. A fourth PMULH 146 would also be issued to multiply elements of the second packed data 708 and corresponding elements of the first memory operand 704, thereby generating a fourth set of intermediate results. A final instruction, either a PSUB 142 or PADD 144, would also be issued to perform an arithmetic operation between corresponding elements of the third and fourth set of intermediate results, thereby generating a second set of final results representing a two dimensional rotation of the elements 708a–708d of the second packed data 708.

From the above description, it will be apparent that the invention disclosed herein provides a novel, accelerated, and advantageous computer implemented method of generating a two dimensional rotation of packed data. As will be understood by those familiar with the art, the invention may be embodied in other specific forms without departing from its essential features, and thus, the described embodiments are not restrictive of the scope of the invention. The following claims are indicative of the scope of the invention, and all variations which come within the meaning and range of equivalency of the claims are to be embraced within their scope.

What is claimed is:

1. In a computer system, a method for generating a two dimensional rotation of packed data elements, said method comprising the steps of:

generating a first set of intermediate results in response to execution of a first instruction which multiplies data elements of a first packed data sequence with corresponding elements of a second packed data sequence, the data elements of said second packed data sequence representing either a sine or cosine function;

generating a second set of intermediate results in response to execution of a second instruction which multiplies the data elements of a third packed data sequence with corresponding data elements of a fourth packed data sequence, the data elements of said fourth packed data sequence representing either a sine or cosine function; and generating a first set of final results in response to execution of a third instruction which performs an arithmetic operation between corresponding data elements of said first and second sets of intermediate results.

2. The method of claim 1, further including the steps of:

generating a third set of intermediate results in response to execution of a fourth instruction which multiplies the data elements of said first packed data sequence with corresponding data elements of said fourth packed data sequence;

generating a fourth set of intermediate results in response to a fifth instruction by multiplying said data elements of said second packed data with corresponding elements of said third packed data;

generating a second set of final results in response to a sixth instruction by performing an arithmetic operation between corresponding elements of said third and fourth sets of intermediate results, wherein said second set of final results representing a two dimensional rotation of said elements of said third packed data, and said first of final results representing a two-dimensional rotation of said element of said first packed data.

3. The method of claim 2, wherein said data elements of said first and third packed data represent data values stored in a planar format.

4. The method of claim 3, wherein said data elements of said first packed data are stored as representing separate positions along a first axis of a two dimensional graph.

5. The method of claim 4, wherein said data elements of said third packed data are stored as representing separate positions along a second axis of said two dimensional graph corresponding to said positions of said first packed data.

6. The method of claim 2, wherein said data elements of said first and third packed data represent data values representing multimedia parameters.

7. The method of claim 6 wherein said multimedia parameters represent either audio signals or images.

8. The method of claim 7 or 5, wherein said the elements of said second and fourth packed data representing either said sine or cosine function have been multiplied by a scale representing a predetermined distance of movement on said graph.

9. The method of claim 8, wherein said the elements of the second packed data represent said cosine function, and the elements of said fourth packed data represent said sine function.

10. A machine-readable medium having stored thereon data representing sequences of instructions, said sequences of instruction which, when executed by a processor, cause said processor to perform the steps of:

multiplying data elements in a first packed data with corresponding data elements in a second packed data to generate a third packed data representing a first set of intermediate results, said data elements of said second packed data representing either a sine or cosine function;

multiplying data elements in a fourth packed data with corresponding data elements in a fifth packed data to generate a sixth packed data representing a second set of intermediate results, said data elements of said fifth packed data representing either a sine or cosine function; and performing an arithmetic operation between corresponding elements of said third packed data and said sixth packed data, generating a seventh packed data wherein elements of said seventh packed data represent a two dimensional rotation of said data elements of said first packed data.

11. The machine-readable medium of claim 10, further including the steps of multiplying data elements in said first packed data with corresponding data elements in said fifth packed data to generate an eighth packed data representing a third set of intermediate results;

multiplying data elements in said fourth packed data with corresponding data elements in said second packed data to generate a ninth packed data representing a fourth set of intermediate results; and performing an arithmetic operation between corresponding elements of said eighth packed data and said ninth packed data, generating a tenth packed data wherein elements of said tenth packed data represent a two dimensional rotation of said data elements of said fourth packed data.

12. The machine-readable medium of claim 11, wherein said data elements of said first and fourth packed data represent data values stored in a planar format.

13. The machine-readable medium of claim 12, wherein said data elements of said first packed data are stored as representing separate positions along a first axis of a two dimensional graph.

14. The machine-readable medium of claim 13, wherein said data elements of said fourth packed data are stored as representing separate positions along a second axis of said two dimensional graph corresponding to said separate positions of said first packed data.

15. The machine-readable medium of claim 11, wherein said data elements of said first and fourth packed data represent data values representing multimedia parameters.

16. The machine-readable medium of claim 15, wherein said multimedia parameters represent either audio signals or images.

17. The machine-readable medium of claim 14 or 16, wherein, when said data elements of said second packed data represent a sine function, said data elements of said fifth packed data represent a cosine function, and when said data elements of said second packed data represent a cosine function, said data elements of said fifth packed data represent a sine function.

18. The machine-readable medium of claim 17, wherein said elements of said second and fifth packed data representing either a sine or cosine function have each been multiplied by a scale representing a predetermined distance of movement on said graph.

19. In a computer system, a method of processing two dimensional rotation of data comprising the steps of:

fetching a first instruction;
performing the following steps in response to executing said first instruction,
multiplying a first value and a second value to generate a first intermediate result, said second value representing the product of a scale and either a sine or a cosine of an angle,
multiplying a third value and said second value to generate a second intermediate result,
multiplying a fourth value and said second value to generate a third intermediate result,
multiplying a fifth value and said second value to generate a fourth intermediate result;
fetching a second instruction;
performing the following steps in response to executing said second instruction,
multiplying a sixth value and a seventh value to generate a fifth intermediate result, said seventh value representing the product of a scale and either a sine or a cosine of an angle,
multiplying an eighth value and said seventh value to generate a sixth intermediate result,
multiplying a ninth value and said seventh value to generate a seventh intermediate result,
multiplying a tenth value and said seventh value to generate a eighth intermediate result;
fetching a third instruction;
performing the following steps in response to executing said third instruction:
performing an arithmetic operation between said first intermediate result and said fifth intermediate result to generate a first final result,
performing said arithmetic operation between said second intermediate result and said sixth intermediate result to generate a second final result,
performing said arithmetic operation between said third intermediate result and said seventh intermediate result to generate a third final result, and
performing said arithmetic operation between said fourth intermediate result and said eighth intermediate result to generate a fourth final result, wherein said first, second, third and fourth final results represent two dimensional rotations of said first, third, fourth and fifth values, respectively.

20. The method of claim 19, further comprising the steps of:

fetching a fourth instruction;
performing the following steps in response to executing said fourth instruction,
multiplying said first data value and said seventh value to generate a ninth intermediate result,
multiplying said third value and said seventh value to generate a tenth intermediate result,
multiplying said fourth value and said seventh value to generate an eleventh intermediate result,
multiplying said fifth value and said seventh value to generate a twelfth intermediate result;
fetching a sixth instruction;
performing the following steps in response to executing said fifth instruction,
multiplying said sixth value and said second value to generate a thirteenth intermediate result,
multiplying said eighth value and said second value to generate a fourteenth intermediate result,
multiplying said ninth value and said second value to generate a fifteenth intermediate result,
multiplying said tenth value and said second value to generate a sixteenth intermediate result;
fetching a sixth instruction;
performing the following steps in response to executing said sixth instruction:
performing an arithmetic operation between said ninth intermediate result and said thirteenth intermediate result to generate a fifth final result, performing said arithmetic operation between said tenth intermediate result and said fourteenth intermediate result to generate a sixth final result, performing said arithmetic operation between said eleventh intermediate result and said fifteenth intermediate result to generate a seventh final result, and performing said arithmetic operation between said twelfth intermediate result and said sixteenth intermediate result to generate an eighth final result, wherein said fifth, sixth, seventh and eighth final results represent two dimensional rotations of said sixth, eighth, ninth and tenth values, respectively.

21. The method of claim 20, wherein said first, third, fourth, and fifth values are stored as elements in a first packed data, and said sixth, eighth, ninth, tenth values are stored as elements in a second packed data.

22. The method of claim 21, wherein said elements of said first and second packed data are stored in said first and second packed data in a planar format.

23. The method of claim 22, wherein said elements of said first packed data are stored as representing separate positions along a first axis of a two dimensional graph.

24. The method of claim 23, wherein said data values of said second packed data are stored as representing separate positions along a second axis of a two dimensional graph corresponding to said positions of said first packed data.

25. The method of claim 21, wherein said data values represent multimedia parameters.

26. The method of claim 25 wherein said multimedia parameters represent either audio signals or video images.

27. The method of claim 21, wherein said second data value represents a product of said scale and a cosine of an angle, and said seventh data value represents a product of said scale and a sine of an angle.

28. The method of claim 27, wherein said scale represents a predetermined distance of movement on said graph.

29. In a computer system, a method for generating a two dimensional rotation of packed data elements, said method comprising the steps of:

a) loading a first packed data sequence having four packed words, in response to execution of a first MOVQ instruction;

b) generating a first set of intermediate results in response to execution of a Packed Multiply High (PMULH) instruction, wherein the four packed words of said first packed data sequence are multiplied with corresponding elements of a first memory operand, wherein a most significant 16 bits of each intermediate result is preserved, data elements of said first memory operand each representing a cosine or sine function;

c) loading a second packed data sequence having four packed words, in response to execution of a second MOVQ instruction, d) generating a second set of intermediate results in response to execution of a second PMULH instruction, wherein the four packed words of said second packed data sequence are multiplied with corresponding elements of a second memory operand, wherein a most significant 16 bits of each intermediate result is preserved, data elements of said second memory operand each representing a cosine or sine function;

e) generating a first set of final results in response to execution of either a Packed Addition or a Packed Subtraction instruction, wherein corresponding data elements of said first and second sets of intermediate results are added or subtracted, respectively.

* * * * *

UNITED STATES PATENT AND TRADEMARK OFFICE
CERTIFICATE OF CORRECTION

PATENT NO.   : 5,984,515
DATED        : November 16, 1999
INVENTOR(S)  : Mennemeier et al.

It is certified that error appears in the above-identified patent and that said Letters Patent is hereby corrected as shown below:

Column 4,
Line 12, delete "En", insert -- In --.
Line 60, delete "light", insert -- High --.

Signed and Sealed this

Twenty-fifth Day of March, 2003

JAMES E. ROGAN
*Director of the United States Patent and Trademark Office*